United States Patent
Dugatkin et al.

(10) Patent No.: US 7,627,669 B2
(45) Date of Patent: *Dec. 1, 2009

(54) AUTOMATED CAPTURING AND CHARACTERIZATION OF NETWORK TRAFFIC USING FEEDBACK

(75) Inventors: Diego Dugatkin, Thousand Oaks, CA (US); Clifford Hannel, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 851 days.

This patent is subject to a terminal disclaimer.

(21) Appl. No.: 10/831,452

(22) Filed: Apr. 22, 2004

(65) Prior Publication Data

US 2005/0021715 A1   Jan. 27, 2005

Related U.S. Application Data (60) Provisional application No. 60/472,549, filed on May 21, 2003.

(51) Int. Cl.
*G06F 13/00* (2006.01)
(52) U.S. Cl. .................................... 709/224
(58) Field of Classification Search ............... 709/224
See application file for complete search history.

(56) References Cited

U.S. PATENT DOCUMENTS

| | | | |
|---|---|---|---|
| 4,792,753 A | 12/1988 | Iwai |
| 5,247,517 A | 9/1993 | Ross et al. |
| 5,343,463 A | 8/1994 | van Tetering et al. |
| 5,390,314 A | 2/1995 | Swanson |
| 5,477,531 A | 12/1995 | McKee |
| 5,535,338 A | 7/1996 | Krause et al. |
| 5,568,471 A | 10/1996 | Hershey et al. |
| 5,583,792 A | 12/1996 | Li et al. |
| 5,590,285 A | 12/1996 | Krause et al. |
| 5,600,632 A | 2/1997 | Schulman |
| 5,657,438 A | 8/1997 | Wygodny |

(Continued)

FOREIGN PATENT DOCUMENTS

EP   0895375   2/1999

(Continued)

OTHER PUBLICATIONS

Cooper, Session traces: an enhancement to network simulator. Performance, computing and Communications Conference. Scottsdale, AZ, Feb. 10, 1999.

(Continued)

*Primary Examiner*—Robert B Harrell
(74) *Attorney, Agent, or Firm*—SoCal IP Law Group LLP; Steven C. Sereboff; Mark A. Goldstein (57) ABSTRACT

Automated capturing and characterization of network traffic using feedback is described. A method may include capturing network traffic, compiling network traffic data based on the network traffic, analyzing the network traffic data, and automatically providing instructions based on the analyzing to control the capturing and the compiling. A system on which the method may execute may include one or more chassis or computing devices having one or more network cards. The chassis and/or the computing devices may be connected to one or more networks, and may be connected to one another. A system that implements the method may include collectors, characterization units, and a feedback controller.

27 Claims, 6 Drawing Sheets

U.S. PATENT DOCUMENTS

| | | | |
|---|---|---|---|
| 5,671,351 A | 9/1997 | Wild | |
| 5,751,963 A | 5/1998 | Umetsu | |
| 5,761,486 A | 6/1998 | Watanabe | |
| 5,787,147 A | 7/1998 | Gunderson | |
| 5,787,253 A | 7/1998 | McCreery et al. | |
| 5,822,520 A | 10/1998 | Parker | |
| 5,838,919 A | 11/1998 | Schwaller et al. | |
| 5,850,386 A | 12/1998 | Anderson et al. | |
| 5,850,388 A | 12/1998 | Anderson et al. | |
| 5,854,889 A | 12/1998 | Liese | |
| 5,878,032 A | 3/1999 | Mirek et al. | |
| 5,905,713 A | 5/1999 | Anderson et al. | |
| 5,974,237 A | 10/1999 | Shurmer et al. | |
| 5,974,457 A | 10/1999 | Waclawsky | |
| 5,978,940 A | 11/1999 | Newman | |
| 5,982,852 A | 11/1999 | Schwartz | |
| 6,031,528 A | 2/2000 | Langfahl, Jr. | |
| 6,044,091 A | 3/2000 | Kim | |
| 6,108,800 A | 8/2000 | Asawa | |
| 6,122,670 A | 9/2000 | Bennett et al. | |
| 6,148,277 A | 11/2000 | Asava | |
| 6,172,989 B1 | 1/2001 | Yanagihara et al. | |
| 6,173,333 B1 | 1/2001 | Jolitz | |
| 6,189,031 B1 | 2/2001 | Badger | |
| 6,233,256 B1 | 5/2001 | Dieterich et al. | |
| 6,279,124 B1 | 8/2001 | Brouwer | |
| 6,295,557 B1 | 9/2001 | Foss | |
| 6,317,788 B1 * | 11/2001 | Richardson | 709/224 |
| 6,321,264 B1 | 11/2001 | Fletcher | |
| 6,345,302 B1 | 2/2002 | Bennett et al. | |
| 6,363,056 B1 | 3/2002 | Beigi et al. | |
| 6,446,121 B1 | 9/2002 | Shah | |
| 6,507,923 B1 | 1/2003 | Wall et al. | |
| 6,526,259 B1 | 2/2003 | Ho | |
| 6,545,979 B1 | 4/2003 | Poulin | |
| 6,601,020 B1 | 7/2003 | Myers | |
| 6,621,805 B1 | 9/2003 | Kondylis et al. | |
| 6,678,246 B1 | 1/2004 | Smyth | |
| 6,717,917 B1 | 4/2004 | Weissberger et al. | |
| 6,826,259 B2 | 11/2004 | Hoffman | |
| 6,845,352 B1 | 1/2005 | Wang | |
| 7,099,438 B2 | 8/2006 | Rancu et al. | |
| 7,123,616 B2 | 10/2006 | Weissberger et al. | |
| 7,143,159 B1 | 11/2006 | Grace | |
| 7,327,686 B2 | 2/2008 | Standridge | |
| 7,342,897 B1 | 3/2008 | Nader et al. | |
| 7,366,174 B2 * | 4/2008 | MacFaden et al. | 370/392 |
| 6,430,617 B1 | 8/2008 | Britt | |
| 7,486,728 B2 * | 2/2009 | Park | 375/233 |
| 7,507,948 B2 * | 3/2009 | Park et al. | 250/221 |
| 7,525,473 B2 * | 4/2009 | Chu et al. | 341/176 |
| 2001/0016867 A1 | 8/2001 | Hu | |
| 2002/0056100 A1 | 5/2002 | Shimomura et al. | |
| 2002/0105911 A1 * | 8/2002 | Pruthi et al. | 370/241 |
| 2002/0138226 A1 | 9/2002 | Doane | |
| 2002/0172205 A1 | 11/2002 | Tagore-Brage et al. | |
| 2002/0184527 A1 | 12/2002 | Chun | |
| 2003/0009544 A1 | 1/2003 | Wach | |
| 2003/0043434 A1 | 3/2003 | Brachmann et al. | |
| 2003/0061506 A1 | 3/2003 | Cooper | |
| 2003/0069952 A1 | 4/2003 | Tams | |
| 2003/0139919 A1 | 7/2003 | Sher | |
| 2003/0188003 A1 | 10/2003 | Sylvest et al. | |
| 2003/0231741 A1 | 12/2003 | Rancu et al. | |
| 2004/0111502 A1 | 6/2004 | Oates | |
| 2004/0111519 A1 | 6/2004 | Fu | |
| 2004/0117474 A1 | 6/2004 | Ginkel | |
| 2004/0236866 A1 | 11/2004 | Dugatkin et al. | |

FOREIGN PATENT DOCUMENTS

| | | |
|---|---|---|
| WO | WO 02/56541 | 7/2002 |

OTHER PUBLICATIONS

Ye, Tao, Network Management and Control Using collaborative On-Line Simulation, Rensselaer Polytechnic Institute, 2003.

Ye, Tao, Large-Scale Network Parameter Configuration Using an On-line Simulation Framework, Technical report, ECSE Department, Rensselear Polytechnic Institute, 2002.

San-Qi Li, et al., SMAQ: A Measurment-Based Tool for Traffic Modeling and Queuing Analysis Part I. IEEE Communications Magazine, Aug. 1, 1998.

San-Qi Li, et al., SMAQ: A Measurment-Based Tool for Traffic Modeling and Queuing Analysis Part II, IEEE Communications Magazine, Aug. 1, 1998.

Marchette, A Statistical Method for Profiling Network Traffic, USENIX, Apr-99.

European Patent Office, Supplementary Partial European Search Report; Application No. EP 0207800398, Search Report Dated Jan. 22, 2007, Munich.

IXIA Communications, IxExplorer User's Guide, Revision 2.1.0, Nov. 1, 1999.

US Patent and Trademark Office, Office Action dated Mar. 20, 2008 for U.S. Appl. No. 10/651,427, filed Aug. 28, 2003.

Comer, Douglas E., Internetworking with TCP/IP Principles, Protocols and Architectures. Prentice Hall, 4th Edition, Chapter 7 (p. 95-113), Chapter 13 (p. 197-249), Chapter 32 (p. 581-597), Undated.

Danzig, Peter B. and Sugih Jamin, tcplib: A Library of TCP internetwork Traffic Characteristics, USC-CS-91-495, Computer Science Department, University of Southern California, Los Angeles, CA, 1991.

IXIA Communications, The Ixia 200 Traffic Generator and Analyzer, Product Description, 1997-1999.

Stevens, W. Richard, TCP/IP Illustrated, vol. I: The Protocols, Addison-Wesley, Jan. 31, 1994, Selections of text pp. 1-7, 21-23, 85-96.

Tannenbaum, Andrew S., Data Transmission in the OSI Model, p. 34-35, Computer Networks, Prentice Hall, 3rd Edition, Mar. 1, 1996.

Zec, Marko and Miljenko Mikuc, Real-Time IP Network Simulation at Gigabit Data Rates, Rensselear Polytechnic Institute, Mar. 2003.

* cited by examiner

FIG. 6

AUTOMATED CAPTURING AND CHARACTERIZATION OF NETWORK TRAFFIC USING FEEDBACK

RELATED APPLICATION INFORMATION

This application claims the benefit of U.S. Provisional Application No. 60/472,549 filed May 21, 2003, which is incorporated herein by reference.

This application is related to U.S. Utility Patent Application entitled AUTOMATED CHARACTERIZATION OF NETWORK TRAFFIC filed Aug. 29, 2003 having Ser. No. 10/651,427, which is incorporated herein by reference.

This application is related to U.S. Utility Patent Application entitled REAL WORLD TRAFFIC filed Aug. 21, 2003 having Ser. No. 10/646,983, which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND OF THE INVENTION

1. Field of the Invention

The invention relates to networks and network traffic.

2. Description of Related Art

Networks such as the Internet carry a variety of data communicated using a variety of network devices including servers, routers, hubs, switches, and other devices. Before placing a network into use, the network, including the network devices included therein, may be tested to ensure successful operation. Network devices may be tested, for example, to ensure that they function as intended, comply with supported protocols, and can withstand anticipated traffic demands.

To assist with the construction, installation and maintenance of networks and network devices, networks may be augmented with network analyzing devices, network conformance systems, network monitoring devices, and network traffic generators, all which are referred to herein as network testing systems. The network testing systems may allow for the capturing, analyzing and/or sending of network communications.

DETAILED DESCRIPTION OF THE INVENTION

Throughout this description, the embodiments and examples shown should be considered as exemplars, rather than limitations on the elements claimed below.

The invention described herein provides for successive capturing and analysis of network traffic. The invention allows for an improved representation and evaluation of the genuine behavior of network traffic by using successive capturing and analysis of network traffic. The successive capturing and analysis of network traffic may be used for evaluating, measuring and validating networks, network applications, and network devices; and may be used to generate and/or emulate network traffic.

Environment

Figure 1:
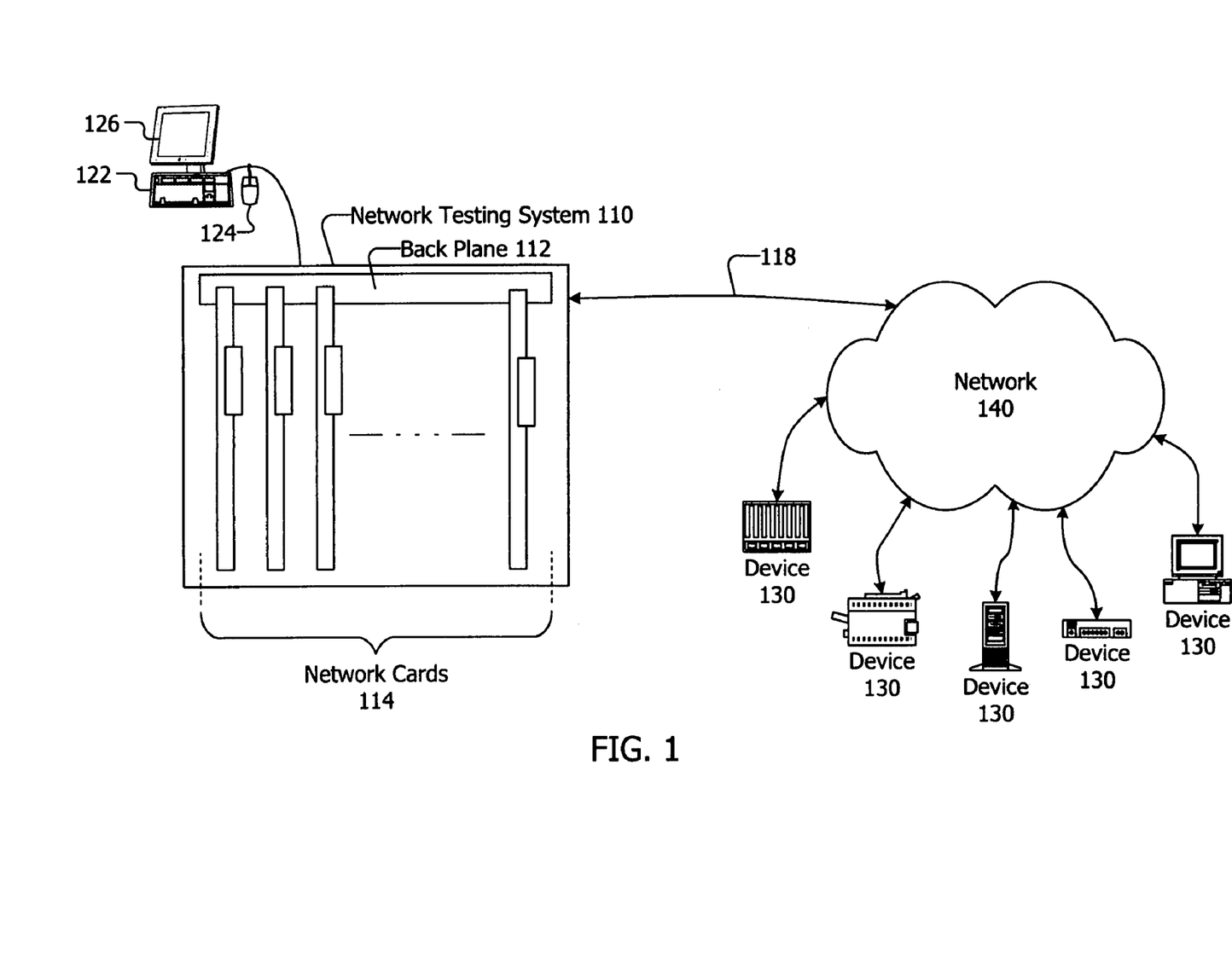
FIG. 1 is a block diagram of an environment in accordance with the invention.

Referring to FIG. 1, there is shown a block diagram of an environment in accordance with the invention. The environment includes network testing system 110 coupled to a network 140. The network testing system 110 may include or be one or more of a performance analyzer, a conformance validation system, a network analyzer, a network management system, and/or others.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 114 and a back plane 112. The chassis of the network testing system 110 and/or one or more of the network cards 114 may be coupled to the network 140 via one or more connections 118. The network cards 114 may be permanently installed in the network testing system 110, may be removable, or may be a combination thereof.

The network testing system 110 may include an operating system such as, for example, versions of Linux, Unix and Microsoft Windows. The network testing system 110 and the network cards 114 may support one or more well known higher level communications standards or protocols such as, for example, the User Datagram Protocol (UDP), Transmission Control Protocol (TCP), Internet Protocol (IP), Internet Control Message Protocol (ICMP), Hypertext Transfer Protocol (HTTP), address resolution protocol (ARP), reverse address resolution protocol (RARP), file transfer protocol (FTP), Simple Mail Transfer Protocol (SMTP); may support one or more well known lower level communications standards or protocols such as, for example, the 10 Gigabit Ethernet standard, the Fibre Channel standards, and one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI); may support proprietary protocols; and may support other protocols. Each network card 114 may support a single communications protocol, may support a number of related protocols, or may support a number of unrelated protocols.

The term "network card" encompasses line cards, test cards, analysis cards, network line cards, load modules, interface cards, network interface cards, data interface cards, packet engine cards, service cards, smart cards, switch cards, relay access cards, CPU cards, port cards, and others. The network cards may be referred to as blades. The network cards 114 may include one or more computer processors, field programmable gate arrays (FPGA), application specific integrated circuits (ASIC), programmable logic devices (PLD), programmable logic arrays (PLA), specialized processors, such as, for example, network processors and classifiers, other kinds of devices, and combinations of these. The network cards 114 may include memory such as, for example, random access memory (RAM). In addition, the network cards 114 may include software and/or firmware. One or more of the network cards 114 may have a resident operating system included thereon, such as, for example, a version of the Linux operating system At least one network card 114 in the network testing system 110 may include a circuit, chip or chip set that allows for communication over a network as one or more network capable devices. A network capable device is any device that may communicate over the network 140.

The connections 118 which may be wire lines, optical fiber cables, wireless communication connections, and others. Although only one connection 118 is shown, multiple connections with the network 140 may exist from the network testing system 110 and the network cards 114.

The back plane 112 may serve as a bus or communications medium for the network cards 114. The back plane 112 may also provide power to the network cards 114.

The network testing system 110, as well as one or more of the network cards 114, may include software that executes to achieve the techniques described herein. As used herein, "software" refers to instructions that may be executed on a computer processor. The software may be implemented in a computer language, and may be executed as object code, may be assembly or machine code, a combination of these, and others. "Software" as used herein also refers to FPGA-ware and loadable programmable logic configurations that may be used to program FPGAs and other programmable logic devices. The term "application" refers to one or more software modules, software routines or software programs and combinations thereof. A "suite" includes one or more software applications, software modules, software routines or software programs and combinations thereof. The techniques described herein may be implemented as software in the form of one or more applications and suites and may include lower level drivers, object code, and other lower level software.

The software may be stored on and executed from any local or remote machine readable medium such as, for example, without limitation, magnetic media (e.g., hard disks, tape, floppy disks), optical media (e.g., CD, DVD), flash memory products (e.g., memory stick, compact flash and others), and volatile and non-volatile silicon memory products (e.g., random access memory (RAM), programmable read-only memory (PROM), electronically erasable programmable read-only memory (EEPROM), and others). A storage device is a device that allows for the reading from and/or writing to a machine readable medium.

The network testing system 110 may include a CPU card that allows the chassis to also serve as a computer workstation. The network testing system 110 may have coupled therewith a display 126 and user input devices such as keyboard 122 and mouse 124, as well as other user input devices including, for example, pens and trackballs, all of which may be coupled to a CPU card included in the chassis. A hard disk drive or other storage device may be included in network testing system 110 to store software that implements the techniques described herein. The software that implements the techniques described herein may be communicated from the CPU card to the network cards included in the network testing system 110.

The network testing system 110 may be located physically adjacent to or remote to the devices 130 in the network 140.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, and may be a segregated test network.

Communications on the network 140 may take various forms, including frames, cells, datagrams, packets or other units of information, all of which are referred to herein as data units. A data unit may be comprised of a header and a payload. Those data units that are communicated over a network are referred to herein as network traffic. The network traffic may include data units included in flows, streams, channels, transactions, and others. The network traffic may span from the physical layer through and including the application layer. The network 140 may be comprised of numerous nodes providing numerous physical and logical paths for data units to travel. There may be plural logical communications links between the network testing system 110 and a given network capable device 130.

The network capable devices 130 may be devices capable of communicating over the network 140 and/or listening to network traffic on network 140. The network capable devices 130 may be computing devices such as workstations, personal computers, servers, portable computers, telephones, personal digital assistants (PDAs), computing tablets, and the like; peripheral devices such as printers, scanners, facsimile machines and the like; network capable storage devices including disk drives such as network attached storage (NAS) and SAN devices; and networking devices such as routers, relays, firewalls, hubs, switches, bridges, traffic accelerators, and multiplexers. In addition, the network capable devices 130 may include appliances such as refrigerators, washing machines, and the like as well as residential or commercial heating, ventilation, and air conditioning (HVAC) systems, alarm systems, and other devices or systems capable of communicating over a network. One or more of the network capable devices 130 may be devices to be tested and may be referred to as devices under test.

The network testing system 110 may be or include one or more computing devices, particularly network capable workstations and/or personal computers. The computing devices may be used in place of or to augment a chassis.

Figure 2:
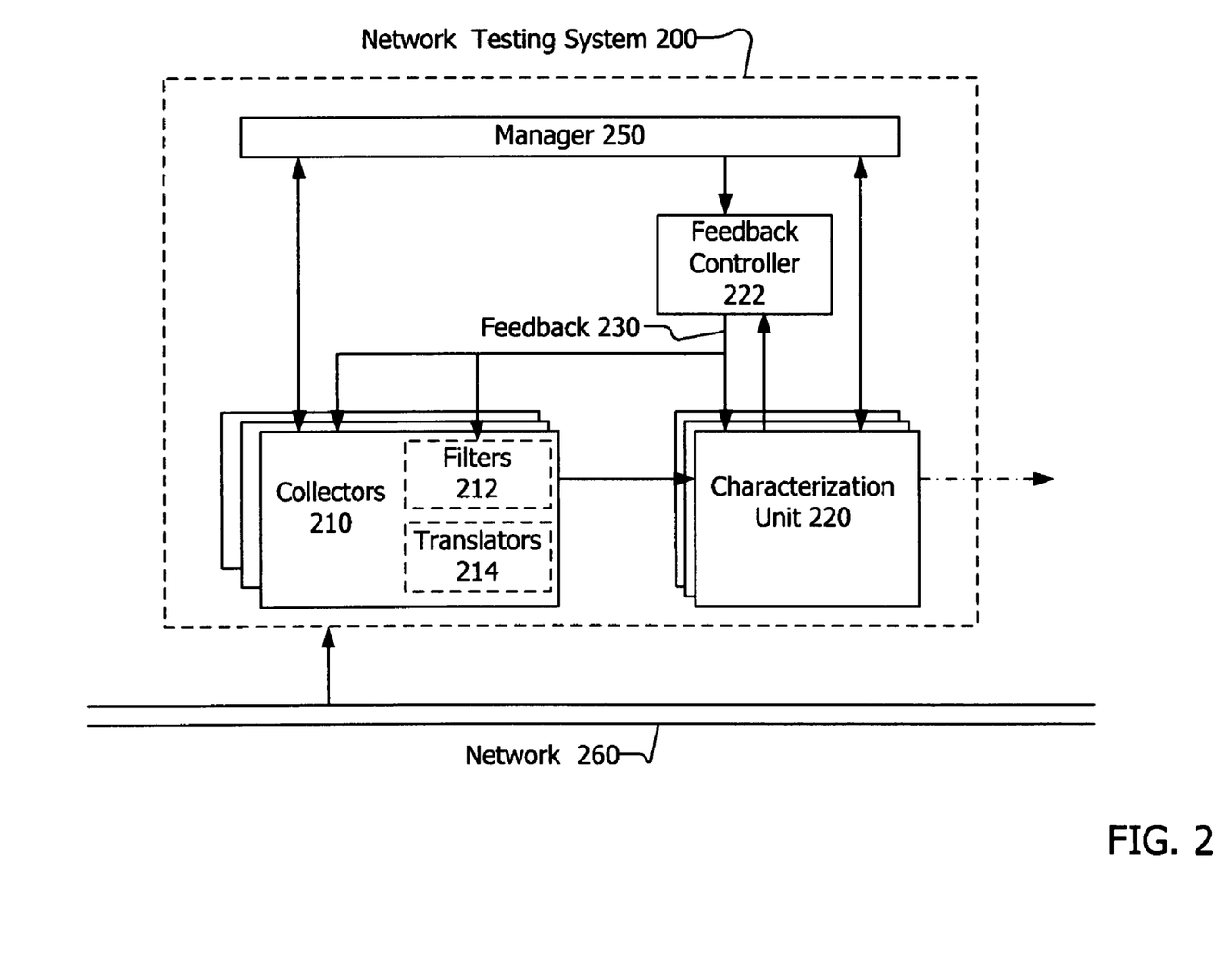
FIG. 2 is a functional block diagram of operating units in accordance with the invention.

FIG. 2 is a functional block diagram of operating units in accordance with the invention. A network testing system 200 may be coupled via one or more communication lines to capture and review network traffic from a network 260. The network testing system 200 may be like the network testing system 110 of FIG. 1. The network testing system 200 may include collectors 210 to capture, to collect, to filter and to perform other operations on network traffic collected from network 260. The collectors 210 may produce network traffic data. The collectors may be coupled to and pass collected and filtered network traffic data and/or the network traffic to the characterization units 220. The characterization units 220 may analyze, model, profile, sort and perform other operations on the collected and filtered network traffic and/or the network traffic data. The manager 250 may provide a user interface to allow a user to view network traffic data; to select, edit and/or create filters 212; to provide instructions or commands to the characterization units 220; and to view network traffic statistics. A feedback controller 222 may be included between the characterization units 220 and the collectors 210 and the filters 212, and may also be coupled to the manager 250 to receive user specified filter instructions.

Collectors 210 review network traffic and gather network traffic data regarding the network traffic on the network 260.

The collectors 210 may also obtain network traffic from one or more networks, and/or two or more locations on a single network and/or on multiple networks, thus allowing for multiple points of network traffic collection. The collectors 210 may also obtain network traffic from one or more data sources. The data sources may be network traffic stored on a storage medium by network testing system 200 and/or one or more local and/or remote network testing systems or network traffic capturing systems. The data sources may also include log files, libraries, or other arrangement of network traffic provided by a third party.

The collectors 210 may review, capture and otherwise obtain network traffic and network traffic data in capture groups. A "capture group" is a group of data units or network traffic data concerning the data units which may be collected according to system defined and/or user defined constraints. The constraints may include a "start trigger" and a "stop trigger". The triggers may specify events that cause the collectors 210 to begin or cease capturing network traffic. The start trigger may be set to be a particular kind of data unit, may be a particular network address specified as a source and/or destination address in a data unit, may be a data rate of the network traffic, and others. The triggers may be sequences of specified data units. The triggers may be a pattern or rule specifying a portion of a network address or other identifying information included in a data unit. The triggers may also be set based on time constraints such that network data is captured over a system or user defined period of time (e.g., 3 minutes, 30 minutes, 3 hours). Network traffic may also be captured until a memory or storage area is full. The triggers may be paired such that a start trigger may specify a start time and a stop trigger may specify a system or user defined threshold, such as a number of data units, a number of a certain kind of data units, and others.

The network traffic data may include protocol distribution data, length distribution data, transaction distribution data, header information, and payload data culled from the collected network traffic.

The protocol distribution data may enumerate the mix of protocols that are present in the collected network traffic. A raw count of data units for each of a group of protocols may be maintained to compile the protocol distribution data. A histogram or other representation, graphical, textual or otherwise, may be presented to a user via the manager 250 to show the protocol distribution of network traffic.

The protocol distribution data compilation may involve multi-segment analysis such as iterative passes or iterative collection of multiple capture groups of network traffic. The protocol distribution data may reflect the proportion of network traffic that is communicated according to various data communications protocols. The iterative protocol distribution data compilation may be achieved via feedback 230.

The length distribution data may be compiled for each protocol, for certain size data units, for certain rate or speed characteristics of data units collected in the network traffic. The transaction distribution data may be compiled based on a count of the most popular kinds or types of transactions that are included in the data units that comprise the collected network traffic. For example, the N most common transaction data units may be counted, where N is 10, 16, 20, 30, 32, or any other number. Header information such as source or destination addresses, and other header data may be counted or maintained such that the most common addresses or most common header information is maintained. Payload data may be maintained to categorize the different network applications that are represented by the network traffic. A count of the most common network applications may be maintained by the collectors 210.

To assist with the analysis of network traffic by characterization units 220, the collectors 210 may count in real time the numbers of data units, the number of bytes per data unit, and maintain other raw data concerning the network traffic. The collectors 210 may perform network traffic data gathering directly at the kernel level, in hardware such as FPGAs and in firmware. This provides for fast collection of network traffic data. Real-time data collection may be used to generate statistically relevant information on the fly, at or close to line rate. As used herein, line rate means the speed at which the network traffic travels on a physical or PHY layer on which it is being communicated. Wire speed is a synonym for line rate.

The collectors 210 may be comprised of one or more units, systems or plug-in modules, each of which may specialize in obtaining data concerning different kinds of data units that comprise the network traffic. Responsibility for collection may be distributed among the specialized collectors. Multiple data collection units may be used to increase the comprehensiveness of collected network traffic and the network traffic data culled from the collected network traffic and/or to increase the performance of the collectors 210. In some circumstances, a first data collection unit may be used initially to determine the traffic mix, and multiple specialized data collection units may be used later based on instructions provided by characterization units 220 via feedback 230. The multiple specialized data collection units may each focus on data units that have particular characteristics, such as network layer protocol, application, destination address, and others. Particular specialized data collectors may be dispatched, recalled, activated, and deactivated by feedback controller 222 via feedback 230 in response to data found in current or preceding capture groups.

The collectors 210 may use or be one or more specialized network cards with data unit scanners to gather raw statistics about the data units included in the network traffic on network 260. The data unit scanner may be implemented at the operating system level. This allows the collectors 210 to gather multiple characteristics of the data units included in the network traffic simultaneously, at or close to line rate. These multiple characteristics of the network traffic may be used to increase the breadth and/or depth of the statistics to be computed by and to increase the accuracy of the statistics and the network traffic characterization based thereon which is computed and compiled by the characterization units 220.

The collectors 210 may include filters 212 and translators 214. When the collectors 210 include multiple data collection units, each of the data collection units may present output in differing formats. Translators 214 may be included with the collectors 210 to convert the network traffic data into a uniform format. The uniform format network traffic data may be passed to the characterization units 220.

The filters 212 may be system defined and/or user-defined. The filters may be defined and modified by characterization units 220 via feedback 230. The filters 212 may be used for various purposes, such as, for example, to restrict the collected network traffic based on the source or destination addresses, the protocols, or any other data fields specified in the data units. Filters 212 may be used to limit data collection to specific network traffic patterns. For example, collect information about a type "C" data unit only after it follows a type "A" and a type "B" data unit.

The manager 250 may provide an interface to allow a user to create and/or modify filters 212 to be used by the collectors 210. This may be achieved by the manager 250 providing an interface to a user via a computer terminal or other computing device coupled to or included in the network testing system 200. The user interface may also be provided by or in conjunction with the collectors 210.

The feedback controller 222 may place requirements on the collectors 210 via feedback 230. The feedback controller 222 may control via feedback 230 the kind, type, scope, breadth and depth of information included in the network traffic data by the collectors 210 and the filters 212. As the feedback controller 222 learns additional information about the network traffic, the feedback controller 222 may via feedback 230 successively request more detailed information about more limited sets or kinds of data units in the network traffic. That is, information gleaned from earlier capture groups may be used to refine and define the information sought in later capture groups.

Figure 3:
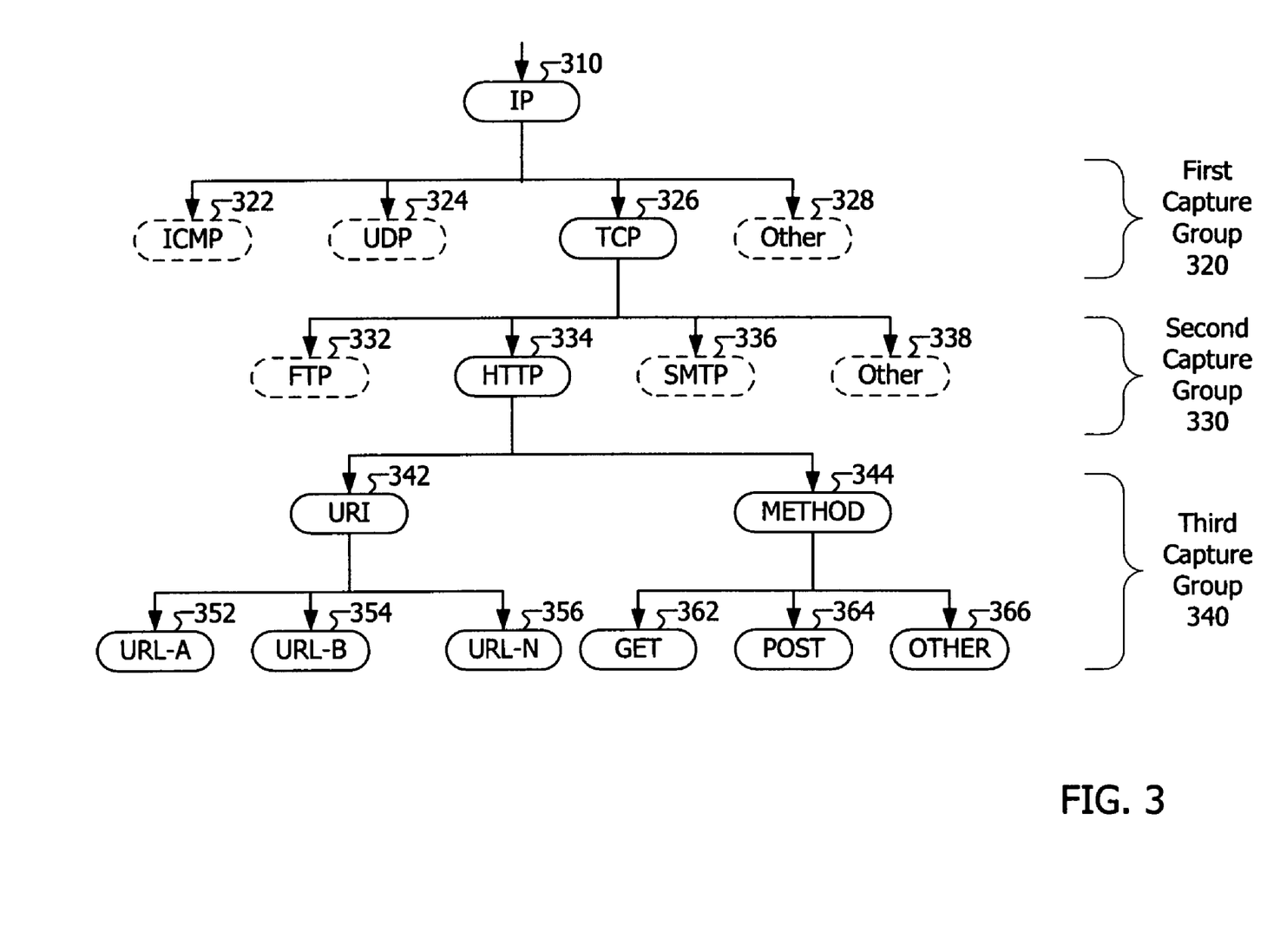
FIG. 3 is a block diagram of successive capture groups in accordance with the invention.

FIG. 3 is a block diagram of successive capture groups showing how the depth and granularity of network traffic data captured, collected and analyzed by the collectors 210 and the filters 212 may be increased in successive capture groups by the feedback controller 222. With successive refinement, a first capture group 320 may include all of the various types of transport protocols, also referred to as layer 3 data units, of all IP data units 310. The transport protocols may be ICMP data units 322, UDP data units 324, TCP data units 326 and other data units 328. In a successive refinement, a second capture group 330 may include all of the TCP data units 326, including FTP data units 332, HTTP data units 334, SMTP data units 336 and other data units 338.

In the next successive refinement, a third capture group 340 may include all HTTP data units 334. The HTTP data units 334 may be analyzed based on the universal resource indicator (URI) 342 included in the HTTP data unit and/or the HTTP method 344 included in the HTTP data units. A further successive refinement of the HTTP data units 334 may result in a capture group based on particular uniform resource locator (URL), such as URL-A 352, URL-B 354 and URL-N 356. A further successive refinement of the HTTP data units 334 may result in a capture group based on particular HTTP methods 344, such as the GET method 362, the POST method 364, and others 366. Other successive refining may be achieved based on system defined and/or user defined instructions included in or provided to the feedback controller 222.

Returning to a discussion of FIG. 2, the feedback controller 222 may also, based on analysis of the network traffic data performed by and provided by the characterization units 220, automatically request via feedback 230 that the collectors 210 collect or maintain additional information concerning the network traffic. This additional information may include protocol type, data unit size, flags specified, ports specified, application program specified, and others. The feedback controller 222 may also request that the collectors 210 limit the collection of data units to particular kinds or types of data concerning specific kinds or types of network traffic. The limitations may specify the collection of data units having a certain size, being of a certain protocol, having certain flags included therein, involving a specified application program, and may designate any other fields that may be specified regarding a data unit.

The characterization units 220 may automatically compile and compute a network traffic characterization derived from or representing a series of assembled statistics based on the network traffic data provided by the collectors 210. The characterization units 220 may provide the network traffic characterizations to the feedback controller 222. The characterization units 220 may receive network traffic data and basic statistics (e.g., raw count of data units, raw count of data units of particular protocol types, etc.) concerning network traffic in a standardized format from the collectors 210, and may create a set of statistical indicators. The characterization units 220 may gather statistics, provide traffic data analysis, and generate user readable reports that may be web-accessible in conjunction with preparing the network traffic characterization.

When capturing network traffic, the collectors 210 may not have the capability to identify the type and kind of each of the data units included in the network traffic. The collectors 210 may classify known kinds or types of data units for which a fine granularity of information need not be maintained as "other" data units. The collectors 210 may classify unknown kinds or types of data units that are found in the network traffic as "wildcard" data units. The collectors 210 may provide basic statistics regarding the classes of other and wildcard data units to the characterization units 220.

To obtain additional information concerning the other and/or wildcard data units, the feedback controller 222 may automatically prepare filters and/or filter instructions which may be presented to the collectors 210 and/or the filters 212 via feedback 230. The feedback controller 222 may use the filters and filter instructions passed over feedback 230 to request or instruct the collectors 210 and/or the filters 212 to obtain and maintain as network traffic data particular fields from the other and/or wildcard data units. As the feedback controller 222 learns more about the content of the other and wildcard data units from the characterization units 220, the feedback controller 222 may automatically send further filters and/or filter instructions to the collectors 210 and filters 212 to obtain and maintain information concerning specific fields in the other and/or wildcard data units.

The feedback controller 222 may also use feedback 230 to request that the collectors 210 provide additional details about data units of a most popular kind or type, having a particular source and/or destination address, or having a payload that includes information communicated by a specified application. Similarly, the feedback controller 222 may request that the collectors 210 limit the network traffic data to details about data units of a most popular kind or type, having a particular source and/or destination address, or having a payload that includes information communicated by a specified application.

The feedback controller 222 may automatically use feedback 230 to further refine and define the kinds of statistics gathered and traffic analysis performed by the characterization units 220. As network data is received and processed by the characterization units 220, multiple passes may be made on the network data to refine the processing, analysis and statistics gathered from the network data based on instructions provided by the feedback controller 222.

The characterization units 220 may pass the network traffic characterization and associated statistical indicators to the manager 250 and to other network testing systems, such as, for example, traffic generation systems (not shown). The other network testing system may generate network traffic based on network traffic characterizations and associated data compiled and computed by the characterization units 220. The other network testing system may prepare network traffic generation scripts based on network traffic characterizations and associated data compiled and computed by the characterization units 220 such that the network traffic generation scripts may be used by a network testing system may use to generate network traffic. In addition, the characterization units 220 may pass the network traffic characterization and associated statistical indicators to a local or remote storage device for a network testing to analyze or otherwise process or use at a later time.

The characterization units 220 may provide an interface to the manager 250 and to external components such as network protocol analyzers and traffic generators to allow a user to examine network traffic statistics in real-time or otherwise.

The manager 250 may be coupled to the collectors 210 and the characterization units 220. The manager 250 may provide a user interface by which a user may access information concerning the collected network traffic and network traffic data, and the compiled and computed information of the characterization units 220. In addition, the manager 250 may provide a user an interface to define the kinds or types of network traffic the collectors 210 may collect and filter, may allow a user to edit or augment the analysis performed by the characterization units 220, and may allow a user to perform other tasks. The manager 250 may provide a user interface by which a user may control and instruct the feedback controller 222.

The manager 250 may generate reports, graphics, and charts describing the incoming network traffic data unit mix, the overall throughput of the network 260, application throughput seen on the network 260, and other characteristics of the network 260 and the network traffic that populates the network 260.

With regard to all of the network testing systems described herein, additional and fewer units, blocks, communication lines, modules or other arrangement of software, hardware, firmware and data structures may be used to achieve the system and techniques described herein.

Figure 4:
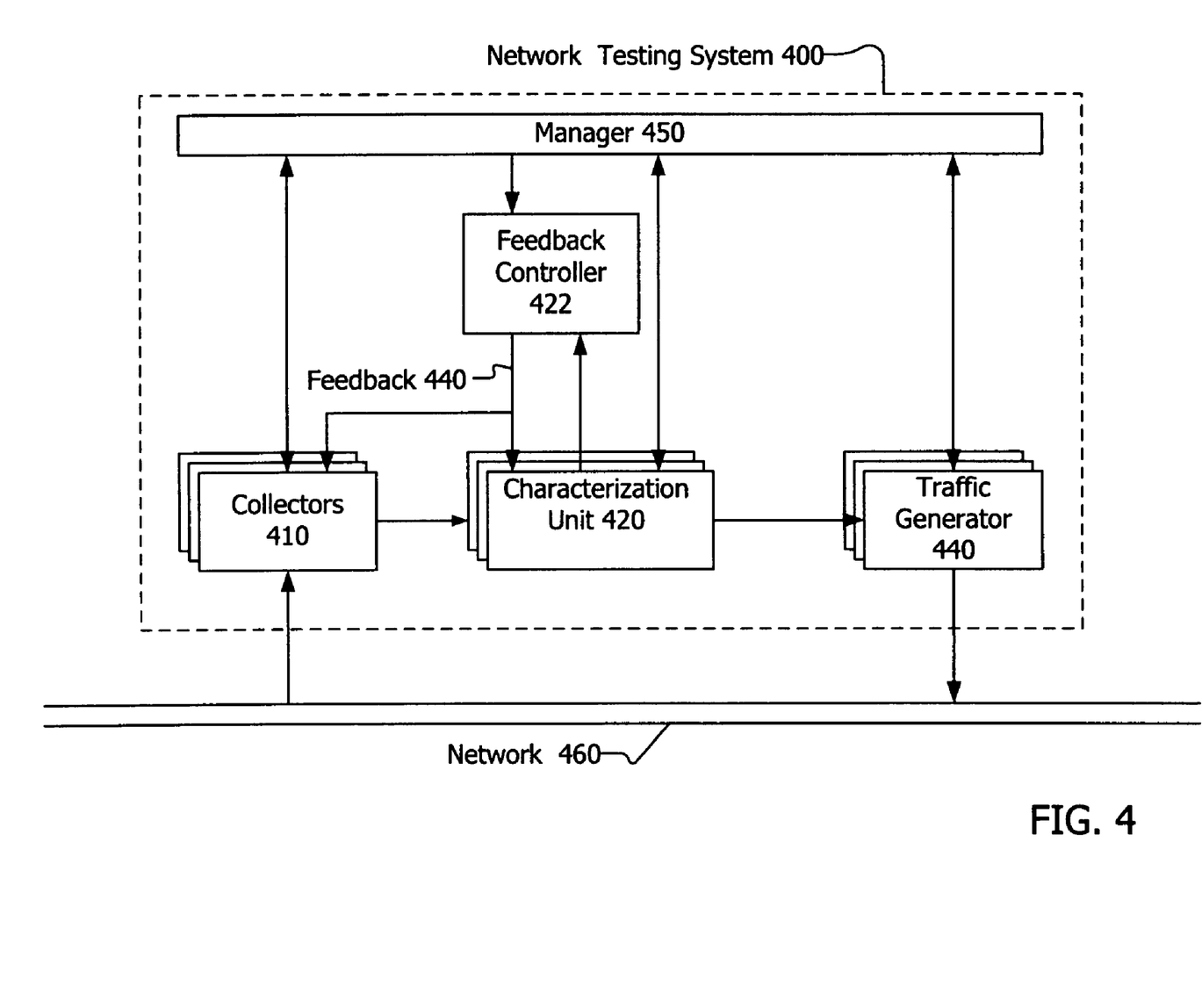
FIG. 4 is a second functional block diagram of operating units in accordance with the invention.

FIG. 4 is a second functional block diagram of operating units in accordance with the invention. The network testing system 400 may include collectors 410, characterization units 420 and a traffic generator 440, each coupled to a manager 450. The collectors 410 may be coupled to receive network traffic from a network 460, and the traffic generator 440 may be coupled to transmit network traffic onto the network 460.

The collectors 410 may capture, receive and review network traffic from network 460. The collectors 410 may prepare basic statistics. The collectors 410 may include filters and translators as described above with regard to FIG. 2. The characterization units 420 may compute and compile detailed statistics and performs statistical analysis based on the network traffic data and the basic statistics provided by the collectors 410 to create a network traffic characterization. The characterization units 420 may be coupled to a feedback controller 422. The feedback controller 422 may control what is included in the network traffic data and may control what network traffic is captured and reviewed by the collectors 410 by sending filter instructions to the collectors 410 over feedback 430. The collection of network traffic data by the collectors 410 may be automatically progressively refined and defined by the feedback controller 422 via feedback 430. Similarly, the characterization of network traffic by the characterization units 420 may also be automatically progressively refined by the feedback controller 422 via feedback 430.

The manager 450 may provide a user interface by which a user may issue commands or otherwise control the types and kinds of network traffic captured by the collectors and specify the statistical analysis and other computations and calculations to be performed by the characterization units 420.

The characterization units 420 may provide the results of statistical analysis of the network traffic to a traffic generator 440. The traffic generator 440 may prepare and transmit data units onto the network 460 or another network that replicates the mix of the types and kinds of network traffic collected by collectors 410. Multiple traffic generation units may be included in traffic generator 440. Each of the traffic generators 440 may specialize in generating traffic according to a particular communications protocol. Scripts, tests, and other sets of instructions may be used to control the traffic generators 440, including selecting a communication protocol to use for traffic generation. In addition, pattern or mix of network traffic prepared and transmitted by traffic generators 440 may be amplified, attenuated, customized, etc. based on scripts and other instructions.

Figure 5:
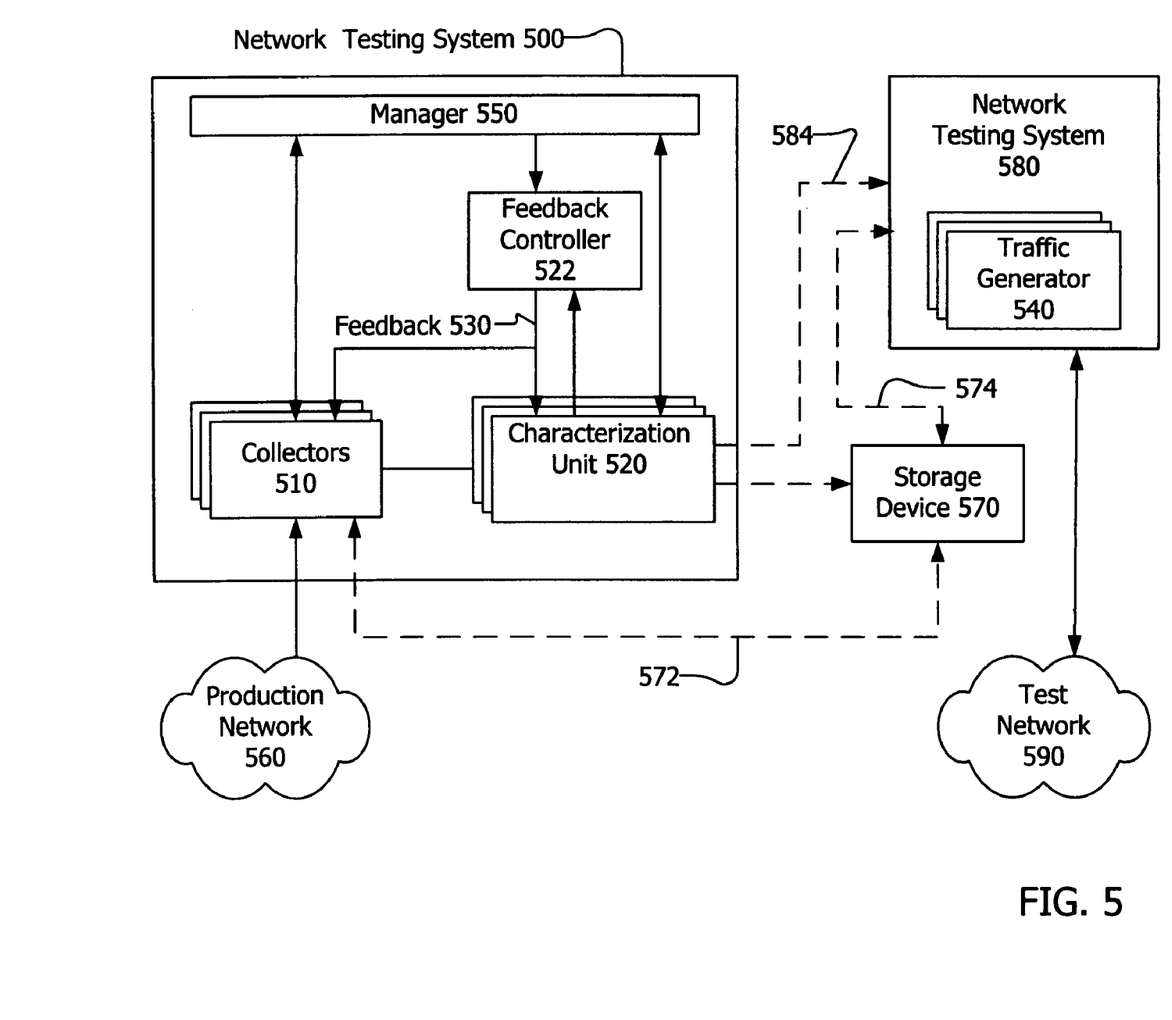
FIG. 5 is a third functional block diagram of operating units in accordance with the invention.

FIG. 5 is a third functional block diagram of operating units in accordance with the invention. A network testing system 500 may be coupled with a production network 560, may be coupled to a storage device 570 via connection 584 and/or connection 572, and may be coupled with a second network testing system 580 via connection 574. The network testing system 500 may include collectors 510, characterization units 520, and a feedback controller 522, each coupled to a manager 550. The collectors 510 may be coupled to receive network traffic from production network 560. The components of the network testing system 500 are generally the same as and have the same functionality as the network testing system 200 discussed above regarding FIG. 2.

The second network testing system 580 may be coupled to a test network 590. The second network testing system 580 may include a traffic generator 540 and may be coupled to transmit network traffic onto test network 590. The second network testing system 580 may also analyze network traffic received over the test network 590.

The term "production network" as used herein means a network that is up and running in the regular course of business. As such, a production network includes network traffic from and between end users and other client devices and servers such as web servers and application servers, as well as other network capable devices attached to or otherwise communicating over the production network 560. The network testing system 500 may listen to the traffic on and capture or review network traffic from the production network 560.

The network testing system 580 may be coupled to a test network 590 via one or more connections. The term "test network" means any network that is to be tested, including private segregated networks and a publicly accessible networks. The test network 590 may include one or more network capable devices which may be tested and may be referred to as devices under test. The network testing system 580 may send or otherwise transmit or communicate data units directed to network capable devices over the test network 590.

The feedback controller 522 may control what is included in the network traffic data and may control what network traffic is captured and reviewed by the collectors 510 by sending instructions to the collectors over feedback 530. The collection of network traffic data by the collectors 510 may be progressively refined and defined by the feedback controller 522 via feedback 530. Similarly, the characterization of network traffic by the characterization units 520 may also be progressively refined by the feedback controller 522 via feedback 530. The feedback controller 522 may coordinate the automated defining and refining of instructions sent to collectors 510 and characterization units 520 via feedback 530.

The characterization units 520 may pass the network traffic characterization and associated statistical indicators to other network testing systems such as network testing system 580. The network testing system 580 may generate network traffic based on network traffic characterizations and associated data compiled and computed by the characterization units 520.

This generation may be achieved in real-time upon receipt of network traffic characterizations and associated data from the network testing system 500, or may be performed later in time. In addition, the characterization units 520 may pass the network traffic characterization and associated statistical indicators to a local or remote storage device such as storage device 570 via connection 570. The network traffic characterization may be stored alone or with other network traffic characterizations in a library.

A network characterization library may include multiple network characterizations prepared by multiple network testing systems at various times, and may be indexed or accessed according to any of a variety of criteria, including capture date, traffic composition, source and destination addresses, characterizing system, and others. The network characterization library may be accessed by local or remote network testing systems, including network traffic generators, for later analysis and use.

Storage device 570 may be an internal or external storage device of network testing system 500 or network testing system 580, or may be a storage device attached to another computing device. Storage device 570 may receive network traffic from collectors 510 and store it for current or later analysis by a local or remote network testing system such as network testing systems 500 and 580. Similarly, network testing system 580 may obtain network traffic and store it on storage device 570 via connection 574 such that collectors 510 may obtain or request the network traffic from storage device 570 via connection 572.

In addition, network testing system 500 may receive network traffic from network 560 and store it on storage device 570 via connection 572 such that collectors 510 may later obtain the network traffic from storage device 570 via connection 572. The collectors 510 may use storage device 570 as a capture buffer, storing network traffic on storage device 570 for later retrieval when the traffic load is too large for the collectors 510 to process immediately. The collectors 510 may store certain types of network traffic on storage device 570 for later retrieval while passing other types of network traffic to the characterization unit 520. For example, layer 4 data units may be stored on device 570 while layer 7 data units are passed to the characterization unit. For another example, UDP data units may be stored on storage device 570 while TCP data units may be provided to the characterization unit 520.

Methods

Figure 6:
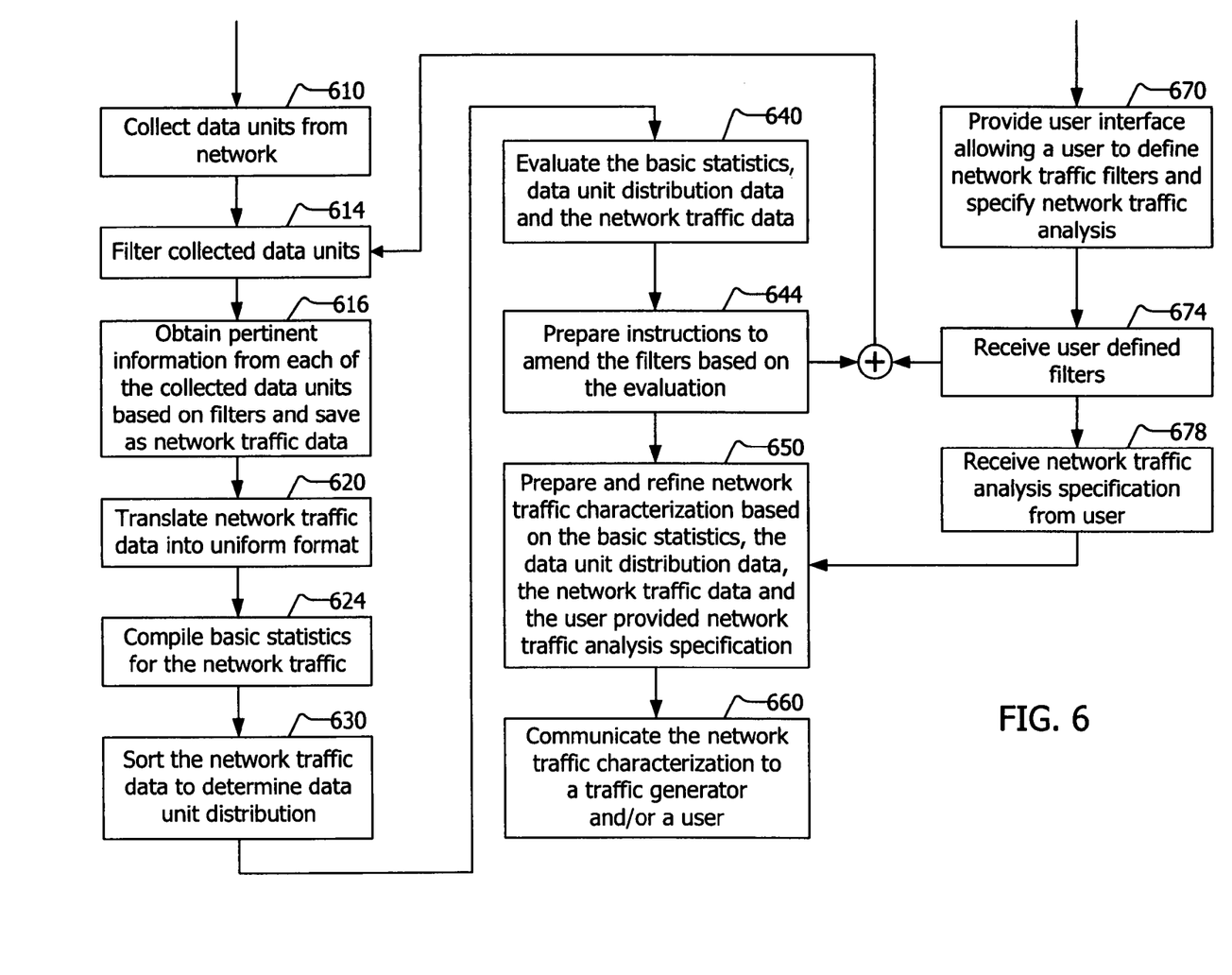
FIG. 6 is a flow chart of a method in accordance with the invention.

FIG. 6 is a flow chart of a method in accordance with the invention. Data units may be collected from a network, as shown in block 610. The network may be a production network. The data units may be collected by various plug-ins, modules or units, each of which may collect or review data units of a particular kind or type. The data units are filtered, as shown in block 614. The filters may be system defined and/or user defined. The filters may also be amended filters refined and/or defined by the system and may be provided via a feedback loop. The filters may limit collection and review of data units based on specified characteristics such as size of the data units, layer of the data units, application that sent the data unit, protocol included in the data unit, and others.

Pertinent information from each collected data unit is obtained and saved as network traffic data based on the filters, as shown in block 616. That is, the filters control what information for data units is retrieved and maintained as network traffic data. The pertinent information may be obtained by various plug-ins, modules or units, each of which may store the pertinent information in varying formats. The pertinent information for each of the data units, the network traffic data, may then be translated into a uniform format, as shown in block 620.

The collectors 210, 410 and 510 and filters 212 of FIGS. 2, 4 and 5 may perform the actions described in blocks 610, 614, 616 and 620.

Basic statistics for the network traffic may be compiled, as shown in block 624. The network traffic data may be sorted to determine the data unit distribution, as shown in block 630. The distribution of network traffic may be computed according to data unit size, data unit protocol type, data unit layer, data unit application, and other data unit attributes.

The collectors 210, 410 and 510 of FIGS. 2, 4 and 5 may perform the actions described in blocks 624 and 630. Alternatively, the characterization units 220, 420 and 520 may perform the actions described in blocks 624 and 630.

The basic statistics, the data unit distribution data and the network traffic data may be evaluated, as shown in block 640.

Instructions to amend the filters may be prepared based on the evaluation, as shown in block 644. These filter instructions may amend the filters to limit data unit collection and/or compilation of network traffic data to specified data units having a certain size, being of a certain protocol, having certain flags included therein, involving a specified application program, and any other fields that may be specified regarding a data unit. These filter instructions may amend the filters to obtain additional information and/or additional data units for specified kinds or types of data units or data units having certain characteristics, such as, for example, data units having a certain size, being of a certain protocol, having certain flags included therein, involving a specified application program, and any other fields that may be specified regarding a data unit. The additional information may be port data, payload data, application data, flag data and other information included in data units.

The filter instructions may also be multipart or complex, and may be a script that causes the filters to collect and process particular data units only after a sequence of other data units have been found on the network. Filters may also be applied in sequence, rotate in time, and conform to other configurations.

The kind of filters in use may be based on the evaluation. The filters may be activated and deactivated based on the evaluation. This may be achieved at least in part by dispatching and recalling collectors as described above in FIGS. 2 and 5. The filter instructions and/or amended filters may then be used when collecting data units from the network at block 610, to filter the collected data units at block 614 and to obtain pertinent information from the collected data units at block 616. This is shown by the connection from block 644 to block 610.

The characterization units 220, 420 and 520 and the feedback controllers 222, 422 and 522 may perform the actions described in blocks 640 and 644.

A user interface may be provided that allows a user to define network traffic filters and specify the network traffic analysis to be performed, as shown in block 670. The user interface may be provided by a manager such as managers 250, 450 and 550 of FIGS. 2, 4 and 5. The user defined network traffic filters may be received, as shown in block 674. The user defined network traffic filters may then be used when collecting data units from the network at block 610, to filter the collected data units at block 614 and to obtain pertinent information from the collected data units at block 616.

A network traffic analysis specification provided by a user may be received, as shown in block 678. The network traffic analysis specification may be used when preparing the network traffic characterization at block 650. The network traffic analysis specification may specify various characteristics of the network traffic the user wishes to have analyzed. The network traffic analysis specification may include commands or instructions that cause the network traffic characterization to include information concerning source and destination addresses, data unit types and subtypes, data unit protocols, port identifiers, data unit source programs, and others.

The network traffic characterization may be prepared and refined based on the basic statistics, the data unit distribution data and the network traffic data according to any network traffic analysis specification received from a user, as shown in block 650. The network traffic characterization may be prepared for a particular capture group and/or as a summary of all network traffic of all capture groups.

The network traffic characterization may be communicated to or made available to a traffic generator and/or displayed to a user, as shown in block 660. This may be achieved in real-time, or the network traffic characterization may be stored on a storage medium for later communication to or access by a traffic generator, user or other entity. In addition, the network traffic characterization may be stored in a network characterization library in a storage device for later use by one or more network testing systems.

The characterization units 220, 420 and 520 may perform the actions described in blocks 650 and 660.

In a system that includes or is coupled to a traffic generator, outgoing data units may be generated based on the network traffic characterization. That is, according to the network traffic characterization, outgoing data units may be transmitted in patterns, numbers, streams, volume, distribution, sequences, and the like that replicate or approximate the population of data units collected as network traffic.

Additional and fewer steps may be taken, and the steps may be combined or further refined to achieve the methods described herein.

Although exemplary embodiments of the invention have been shown and described, it will be apparent to those having ordinary skill in the art that a number of changes, modifications, or alterations to the invention as described herein may be made, none of which depart from the spirit of the invention. All such changes, modifications and alterations should therefore be seen as within the scope of the invention.

It is claimed:

1. A method to capture and analyze network traffic performed by a network testing system coupled with a network, the network testing system including a plurality of network cards, the network testing system including software which when executed causes the network testing system to perform actions comprising:
    capturing network traffic from the network based on a first set of filters
    compiling network traffic data based on the network traffic, wherein the network traffic data includes at least one of protocol distribution data, length distribution data, transaction distribution data, header information, and payload data
    computing basic statistics based on the network traffic data
    sorting the network traffic data to determine network traffic distribution data
    automatically preparing amended filters based on the network traffic data, the basic statistics and the network traffic distribution data
    capturing additional network traffic based on the amended filters
    compiling additional network traffic data based on the additional network traffic
    performing analysis of the additional network traffic data to produce a network traffic characterization.

2. The method of claim 1 further comprising:
    preparing refined analysis instructions based on the network traffic characterization
    performing analysis of the network traffic data based on the refined analysis instructions.

3. The method of claim 2 further comprising:
    preparing refined filters based on at least the network traffic characterization
    performing analysis of the additional network traffic data based on the refined filters.

4. The method of claim 1 further comprising
    providing a user interface to a user
    receiving user defined filters
    capturing network traffic based on the user defined filters.

5. The method of claim 4 further comprising
    receiving a network traffic analysis specification from the user.

6. The method of claim 1 wherein the network traffic includes a plurality of data units adhering to a plurality of communications protocols.

7. The method of claim 6 wherein the plurality of communications protocols includes at least a User Datagram Protocol (UDP), a Transmission Control Protocol (TCP), and a Hypertext Transfer Protocol (HTTP).

8. A machine readable medium having instructions stored thereon which when executed by a processor cause a network testing system to perform operations comprising:
    capturing network traffic from a network based on filters
    compiling network traffic data based on the capturing, wherein the network traffic data includes at least one of protocol distribution data, length distribution data, transaction distribution data, header information, and payload data
    analyzing the network traffic data to produce a network traffic characterization
    successively refining the capturing and the compiling based on the network traffic characterization, the successively refining including automatically providing a first set of instructions to control the capturing and the compiling, the first set of instructions based on the analyzing
    preparing a second set of instructions based on the network traffic characterization
    providing the second set of instructions to control the analyzing
    preparing generated network traffic based on the network traffic characterization
    transmitting the generated network traffic onto the network.

9. The machine readable medium of claim 8 wherein the network traffic is comprised of a plurality of data units adhering to a plurality of communications protocols.

10. The method of claim 9 wherein the plurality of communication protocols includes at least a User Datagram Protocol (UDP), a Transmission Control Protocol (TCP), and a Hypertext Transfer Protocol (HTTP).

11. The machine readable medium of claim 8 wherein the filters are at least one of user defined and system defined.

12. The machine readable medium of claim 8 wherein the providing comprises
    preparing amended filters based on the instructions such that the capturing and the compiling are based on the amended filters.

13. The machine readable medium of claim 8 coupled with the network testing system.

14. The machine readable medium of claim 8 wherein the network is a production network.

15. The machine readable medium of claim 8 wherein the network is a test network.

16. A method of capturing and analyzing network traffic performed by a network testing system coupled with a network, the network testing system including a plurality of network cards, the network testing system including software which when executed causes the network testing system to perform actions comprising:

capturing network traffic from the network based on filters     compiling network traffic data based on the capturing, wherein the network traffic data includes at least one of protocol distribution data, length distribution data, transaction distribution data, header information, and payload data     analyzing the network traffic data to create a network traffic characterization     automatically providing a first set of instructions to control the capturing and the compiling, the first set of instructions based on the network traffic characterization     preparing amended filters based on the first set of instructions such that the capturing and the compiling are based on the amended filters     successively refining the capturing and the compiling based on the first set of instructions     preparing a second set of instructions based on the network traffic characterization     providing the second set of instructions to control the analyzing     preparing generated network traffic based on the network traffic characterization     transmitting the generated network traffic onto the network.

17. The method of claim 16 wherein the network traffic is comprised of a plurality of data units adhering to a plurality of communications protocols.

18. The method of claim 17 wherein the plurality of communication protocols includes at least a User Datagram Protocol (UDP), a Transmission Control Protocol (TCP), and a Hypertext Transfer Protocol (HTTP).

19. The method of claim 16 wherein the filters are at least one of user defined and system defined.

20. A system to capture and analyze network traffic, the system comprising:

a processor a storage medium having software stored thereon which when executed by the processor causes the system to provide     a plurality of collectors to capture network traffic and to compile network traffic data, wherein the collectors are configured to filter the network traffic, wherein the collectors each include at least one data collection unit for each of a plurality of communications protocols supported by the system, wherein the network traffic data includes at least one of protocol distribution data, length distribution data, transaction distribution data, header information and payload data     a plurality of characterization units to analyze the network traffic to create a network traffic characterization     a feedback controller coupled with the collectors and the characterization units to control the network traffic captured by the collectors based on the network traffic data and the network traffic characterization, including successively refining the functioning of the collectors and the characterization units by sending instructions to the collectors and the characterization units     a traffic generator to prepare generated network traffic based on the network traffic characterizations received from the characterization units and to transmit the generated network traffic onto the network.

21. The system of claim 20 wherein the instructions are based on the network traffic data and the network traffic characterization.

22. The system of claim 20 wherein the collectors include filters that are at least one of user defined and system defined.

23. The system of claim 20 wherein the plurality of communication protocols includes at least a User Datagram Protocol (UDP), a Transmission Control Protocol (TCP), and a Hypertext Transfer Protocol (HTTP).

24. The system of claim 20 wherein the software when executed by the processor causes the system to further provide a manager to provide a user interface to allow a user to at least one of     view the network traffic data     provide instructions to the collectors     provide commands to the characterization units.

25. The system of claim 20 coupled with a network testing system.

26. The system of claim 20 coupled to a production network.

27. The system of claim 20 coupled to a test network.

\* \* \* \* \*

UNITED STATES PATENT AND TRADEMARK OFFICE
CERTIFICATE OF CORRECTION

PATENT NO. : 7,627,669 B2  Page 1 of 1
APPLICATION NO. : 10/831452
DATED : December 1, 2009
INVENTOR(S) : Dugatkin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1406 days.

Signed and Sealed this

Second Day of November, 2010

David J. Kappos
*Director of the United States Patent and Trademark Office*